W. I. TWOMBLY.
PNEUMATIC TIRE.
APPLICATION FILED JULY 22, 1910.
1,019,286.
Patented Mar. 5, 1912.
3 SHEETS—SHEET 1.
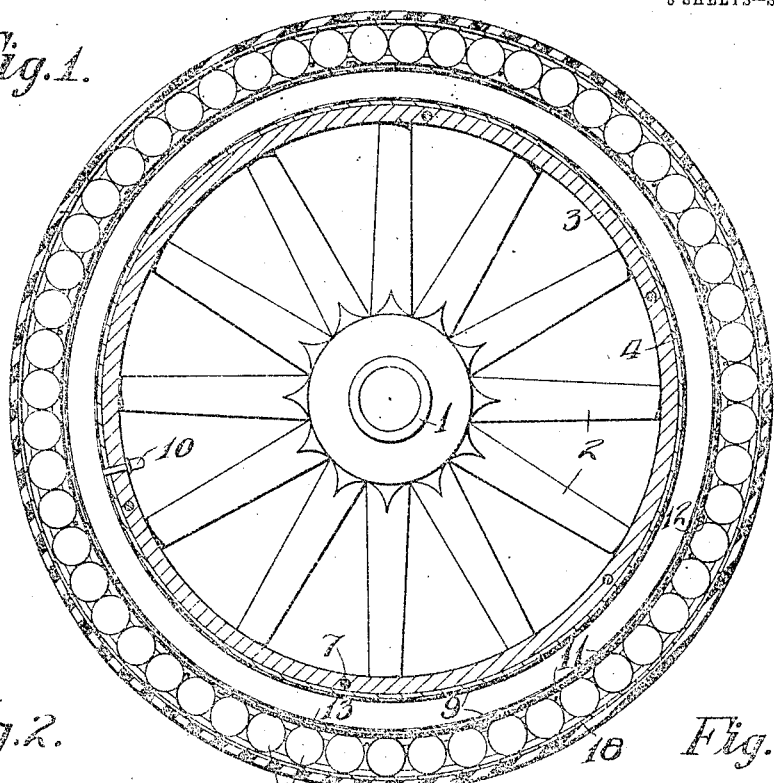
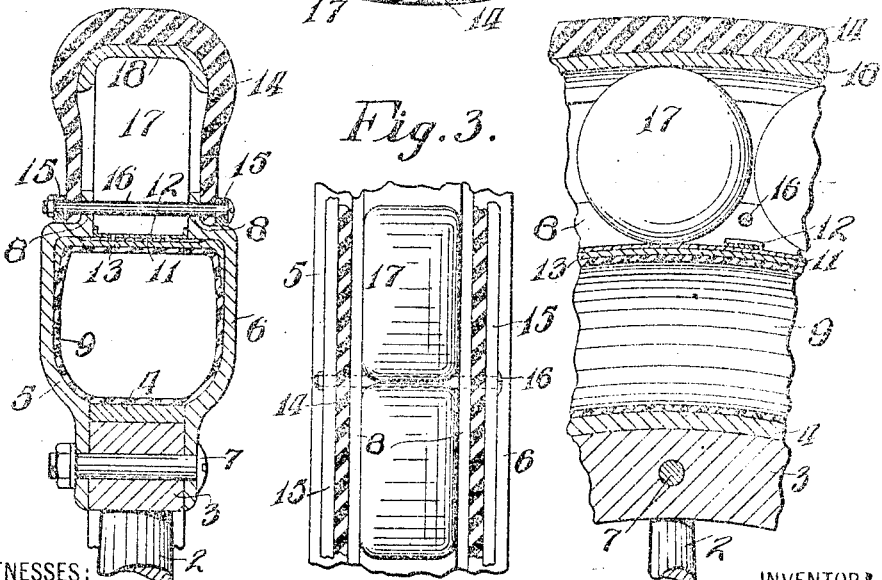
WITNESSES:
Howard E. Thompson
Percy A. Smith
INVENTOR:
Willard Irving Twombly,
ATTORNEY

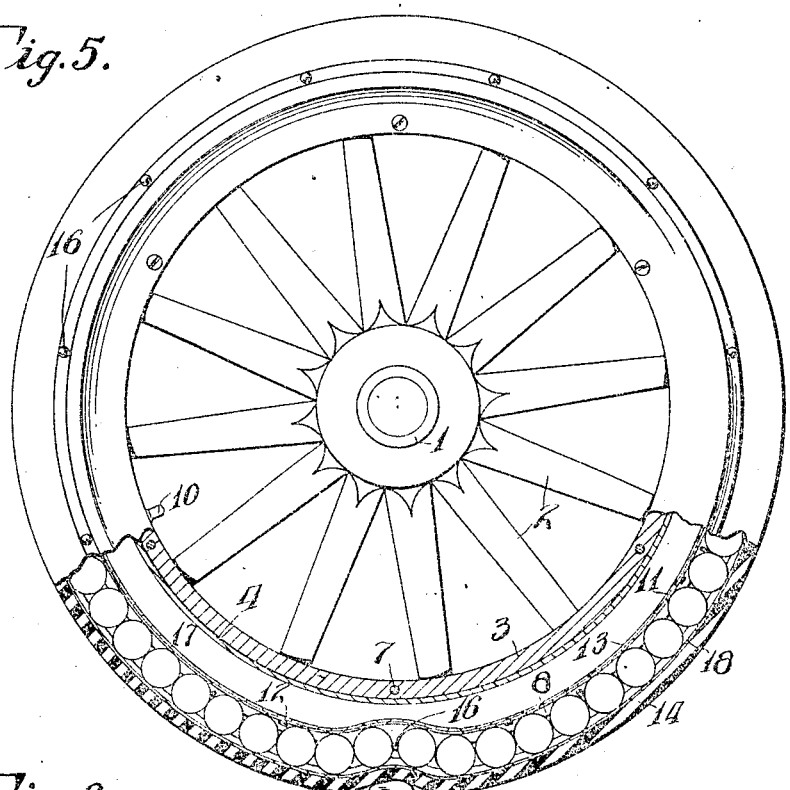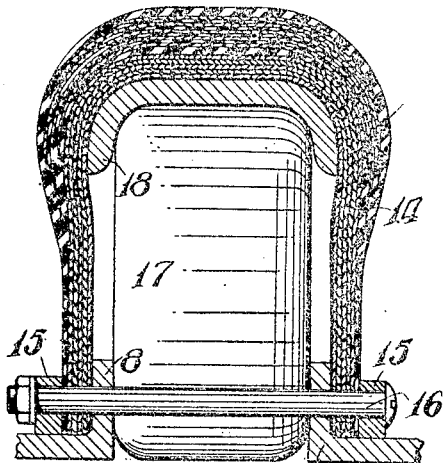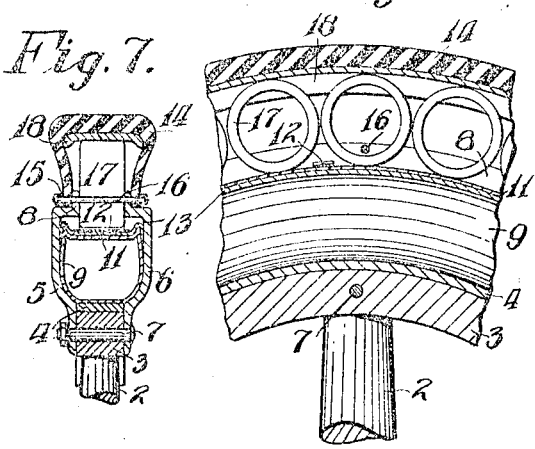

W. I. TWOMBLY.
PNEUMATIC TIRE.
APPLICATION FILED JULY 22, 1910.
1,019,286.
Patented Mar. 5, 1912.
3 SHEETS—SHEET 3.
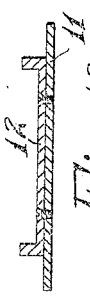
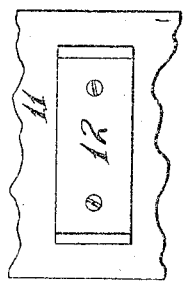
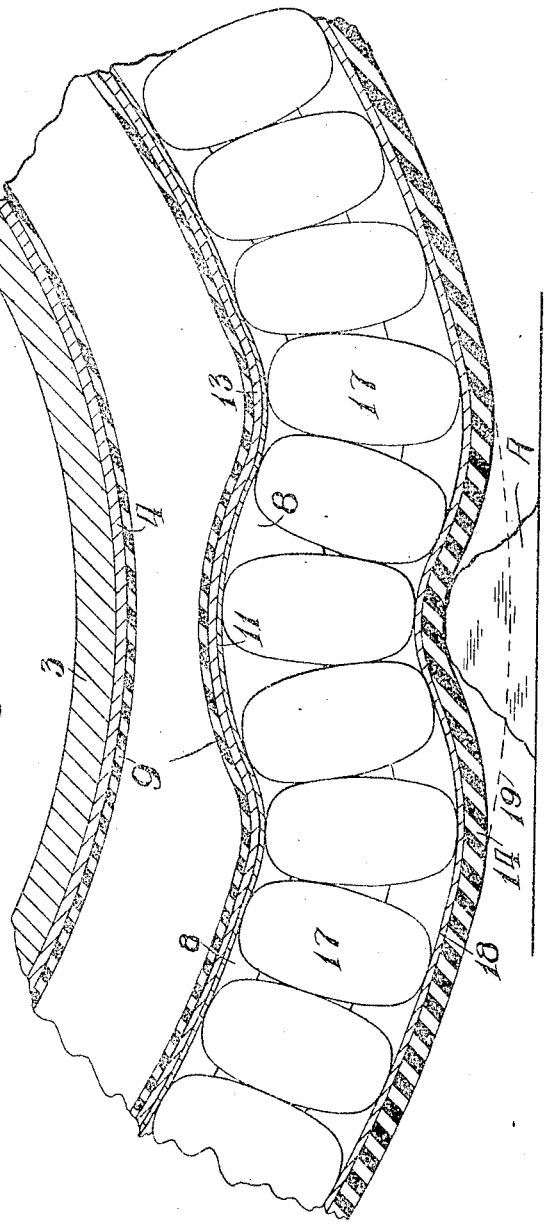
WITNESSES:
Howard E Thompson
Percy A. Smith
INVENTOR:
Willard Irving Twombly,
BY
John O. Seifert
ATTORNEY

UNITED STATES PATENT OFFICE.

WILLARD IRVING TWOMBLY, OF NEW YORK, N. Y., ASSIGNOR TO TWOMBLY MOTORS COMPANY, OF NEW YORK, N. Y., A CORPORATION OF NEW YORK.

PNEUMATIC TIRE.

1,019,286.  Specification of Letters Patent.  Patented Mar. 5, 1912.

Application filed July 22, 1910. Serial No. 573,180.

*To all whom it may concern:*

Be it known that I, WILLARD IRVING TWOMBLY, a citizen of the United States, residing in the borough of Manhattan, in the city, county, and State of New York, have invented new and useful Improvements in Pneumatic Tires, of which the following is a specification.

This invention relates to pneumatic tires for vehicle wheels, and it is the object of the invention to provide a simple, durable, and efficient pneumatic tire, so constructed and arranged as to provide a non-puncturable tire, in which all of the operative or working parts of the tire are inclosed in a water-tight housing or casing.

With this object in view, the invention consists of a non-puncturable rim or casing of channel section fixed to a wheel felly and carrying a pneumatic tube extending circumferentially around the felly; a flexible metallic band also being carried by said rim to have radial flexing movement in said rim; the said rim and metallic band constituting an entirely closed and non-puncturable housing for the pneumatic tube. Circumferentially disposed around and secured to said rim is a cover or shoe of channel section, and a series of members to have independent radial sliding movement into the rim and a rolling or rocking engagement with each other during such radial movement are carried upon the rim between said shoe and the metallic band. The shoe and rim constitute an entirely closed water-tight housing or casing for the working parts of the tire, and the metallic band and pneumatic tube tending always to project the radially movable members outward against the shoe, but as the wheel revolves and said members come in contact with the ground, or when the wheel encounters an obstruction, receiving and taking up the inward radial thrust of said members.

In the drawings accompanying and forming a part of this specification, Figure 1 is a sectional side elevation of a wheel with my improved tire applied thereto. Fig. 2 is an enlarged cross sectional view of the felly and tire. Fig. 3 is a fragmentary detail plan view, partly in section, illustrating the manner of securing the shoe to the rim and the relation of a pair of radial moving and rolling engaging members. Fig. 4 is an enlarged fragmentary sectional detail view of the parts shown in Fig. 2. Fig. 5 is a side elevation, partly in section, of a wheel with my improved tire applied thereto, showing the action of the tire as the wheel encounters and rides over an obstacle. Fig. 6 is an enlarged sectional detail view illustrating a modified form of construction of the shoe. Fig. 7 is a cross sectional view of the felly and tire showing the action of the radial members as they are thrust inward against the air tube and metal band, and also illustrating the manner of pulling a protecting shield between the air tube and said metal band away from the sides of the rim during such movement of the radial members. Fig. 8 is a fragmentary sectional side elevation of the felly and tire illustrating a modified form of the radial movable members. Fig. 9 is a sectional detail showing the manner of securing guides to the metal band to prevent sidewise movement of said band. Fig. 10 is a plan view of the parts shown in Fig. 9. Fig. 11 is an enlarged fragmentary sectional side elevation of a felly and tire illustrating a modified form of radial movable and rolling engaging members, this figure also illustrating the action of the tire, when using this form of radial moving member, as the wheel encounters and rides over an obstacle; and Fig. 12 is a perspective view of one of the radial movable members shown in Fig. 11.

Similar characters of reference designate like parts throughout the different views of the drawings.

In the form of my invention illustrated in the drawings I have shown the same applied to a wheel comprising the usual hub 1, the radiating spokes 2, felly 3, and a metal band 4 extending around the periphery of the felly. A pair of metallic annular outwardly-bulging plates 5, 6, are fixed to either side of the felly by bolts 7, to form a rim or casing of substantially U-shape or channel section, each plate having a laterally and radially or outwardly projecting flange 8. Carried within said rim, and extending around the felly, is an inflatable air tube 9, provided with a valve 10 extending through the felly to which may be connected an air pump to inflate said tube. Within the flanges 8 of the rim is also carried a flexible metal band 11, in the form of an armor for the air tube, to have radial flexing movement in said rim. This metal band is of less width than the width of the channel section of the rim, but of greater width than the distance between the rim flanges 8, and has secured thereto in any suitable manner to extend transversely thereof a series of ribs or guide members 12, the ends of which are bent up and engage between the rim flanges 8 to maintain the band in position in the rim, A flexible protecting band 13 of suitable material, such as leather, is interposed between the band 11 and the air tube 9, said band 13 being of such width as to partly lap around the air tube to protect the latter from rupture by the metal band during its radial flexing movement and also to prevent creeping thereof.

A flexible cover or shoe 14 of channel section and of suitable material, such as rubber, or rubber reinforced with fabric or the like as shown in Fig. 6 is secured at its edges or base portions to the outer faces of the radially projecting portions 8 of the annular plates 5, 6 of the rim so that the base portions of the shoe will rest or be seated upon the laterally projecting portions of the rim flanges 8, the said edges being clamped to said flanges by a pair of annular plates or rings 15, and stay bolts 16 passing through the rings 15, the base portions of the shoe 14, and the radially projecting portions of the flanges 8, not only clamping and securing the shoe to the rim, but also serving to prevent spreading of the rim plates 5, 6.

Circumferentially disposed between the cover or shoe 14 and the flexible metal band 11 are a series of separate and loose members 17 having independent radial sliding movement in to the rim between the flanges 8 thereof, and also having a rolling or rocking engagement with each other during such radial movement, the relation of said flanges to the members 17 being such as to serving as guides for and prevent any sidewise movement of the members.

I preferably provide the cover or shoe 14 with a suitable lining, in the present instance shown as a leather band 18, extending around the inner circumference of the shoe and of a width to lap over the sides of the members 17 to prevent any undue wear of the shoe by the members 17 coming in contact therewith. The said radial members 17 and the shoe 14 constitute the tread of the tire.

The intermediate members may be of any suitable construction and conformation so long as they have a free and independent radial sliding movement into the rim and a rolling or rocking engagement with each other during such movement. In Figs. 1 to 7, inclusive, they are shown as consisting of solid and rigid circular members or rolls of metal, wood, fiber or the like. In Fig. 8 the members are shown as consisting of rings, which may be of rigid metal or they may be of resilient or springy material, so that as they come in contact with the roadway, or the wheel encounters an obstruction, a portion of the shock to which the tire may be subjected will be taken up by such resilient rings; and in Figs. 11 and 12 they are shown of oblong or rectangular shape with the corners rounded and the ends and side edges slightly curved.

In Fig. 5, I have illustrated, somewhat diagrammatically, the action of the tire when the wheel encounters and rides over an obstruction A. As the wheel encounters the obstruction substantially one-third of the shock is imparted to or taken up by the vehicle wheel and body, raising said wheel practically one-third of the height of the obstruction, as illustrated by dotted line 19, the greater portion of the shock, however, being taken up by the tire. As the wheel rides upon the obstruction the outer cover or shoe 14 will substantially conform to the said obstruction forcing the contiguous members 17 radially inward against the metal band 11 and the action of the air in the tube 9, and having a rolling engagement with their contiguous or companion members, the protecting shield, in the present instance in the form of a band 13 between the air tube 9 and the metal band 11, freely pulling away from the inner walls of the rim, the parts of the tire substantially assuming the positions shown in cross section in Fig. 7, which is due to the metal band being of less width than the shield 13.

The members 17 when made solid are so proportioned relatively to the circumferential space between the shoe 14 and the band 11 as to leave a slight clearance space, the aggregate of such space in the whole circumference being approximately one-quarter of an inch or less, to permit of the passage of a stay bolt 16 between a pair of members should the obstruction be encountered by such portion of the tire in which the bolt is located, as clearly shown in Fig. 6. As soon as the wheel has ridden over the obstruction the members 17 are forced outward against the inner circumference of the shoe by the action of the air in the tube 9 and the flexible band 11. It will be obvious that as the wheel rotates and the radial members come in contact with the ground there will be a slight inward radial thrust of said members against the band 11 and air tube.

In case the members are made in the form of rings, either rigid or resilient as illustrated in Fig. 8, the stay bolts 16 may extend through said rings and have radial movement therein, as the rings move radially in the rim, and in which case the rings are so proportioned relatively to the circumferential space between the band 11 and shoe 14 as to substantially fill said space with no clearance whatever between the members.

In Fig. 11, as already stated, I have shown a modified form of the radial members 17, the same being of oblong shape with the corners rounded and the ends and side edges slightly curved so that the same will be capable of having a limited rocking or rolling engagement with each other as they move radially. However, the action of the tire is substantially similar as when radial members of circular conformation are used, the said members being thrust radially inward against the steel band and air tube. As the wheel encounters an obstruction the members adjacent to the one which comes in contact with the obstruction, owing to the conformation that of the shoe and metal band will assume, and the curved faces at the side edges engaging with each other, will cause said members to draw away or spread at the top and roll toward each other at the bottom, all of which is clearly shown in said Fig. 11.

From the foregoing description, and as illustrated in the drawings, it will be obvious that I have produced a pneumatic tire that will readily respond to any shock without undue shock to the vehicle body, and will also substantially conform to any obstruction encountered, and which is in every way as efficient as a pneumatic tire having a shoe of rubber, or a combination of rubber with a fabric reinforcement, and an air tube in said shoe, with the additional advantages, owing to the rim and steel band or armor 11 being constructed of metal or the like, of providing an entirely closed and non-puncturable casing for the air tube with a minimum liability to blow-outs; and also the providing of an entirely closed water-tight casing or housing for the working parts of the tire by securing the shoe and rim together.

Having described my invention, I claim:

1. In a vehicle wheel, the combination of a rim of channel section fixed to the wheel felly, each wall of which has a laterally and radially projecting flange; an air tube in said rim; a flexible band extending around the air tube; a resilient metal band outside of the flexible band; a shoe substantially U-shape in cross section fixed to said rim; and a series of circular members carried by the rim between the metal band and shoe, said members adapted to have independent radial movement into the rim and rolling engagement with each other during such radial movement; and said members being guided by the radially projecting portion of the rim flanges to prevent lateral movement thereof.

2. In a vehicle wheel, the combination with a rim of channel section fixed to the wheel felly, of an inflatable air tube in said rim; a leather band extending around the air tube of such width as to partly lap around the latter; a resilient metal band carried by the rim and extending around the leather band; a series of circumferentially disposed circular members mounted upon the rim outside of the metal band, said members adapted to have independent radial movement into the rim and rolling engagement with each other during said radial movement; and an annular shoe or cover substantially of U-shape in cross section secured to the rim to maintain the circular members in place and with the rim constituting an entirely closed housing for the radial members, bands and air tube.

3. In a vehicle wheel, the combination with the wheel felly, of a pair of annular plates fixed to the sides of the felly to form a rim of channel section, each plate having a laterally and radially projecting flange; an inflatable air tube in said rim; a flexible band extending around the air tube of such width as to partly lap around the air tube; a resilient metal band extending around the flexible band within the laterally projecting portions of the rim plates adapted to have radial flexing movement into the rim; ribs fixed to and extending transversely of the metal band, the ends of said ribs bent up to form flanges to engage between the radially projecting portions of the rim flanges; a series of circumferentially disposed rigid circular members carried by the rim between the radially projecting portions of the rim flanges outside of the metal band; and an annular shoe or cover substantially of U-shape in cross section to maintain the circular members in place, said shoe secured to the radially projecting portions of the rim flanges so that the base portions of the shoe will be seated upon the laterally projecting portions of said rim plates; said circular members normally projected outwardly by the air in the tube and the resilient band, but as they come in contact with the ground as the wheel revolves or encounters an obstruction are adapted to have radial movement into the rim and a rolling engagement with each other during such radial movement; the inward thrust of said members being taken up by the resilient band and the air in the air tube.

WILLARD IRVING TWOMBLY.

Witnesses:
JOHN O. SEIFERT,
PERCY A. SMITH.